United States Patent
Nilsson et al.

(10) Patent No.: US 10,708,788 B2
(45) Date of Patent: Jul. 7, 2020

(54) CONTROLLING AN ANTENNA BEAM OPTIMIZATION ALGORITHM

(71) Applicant: TELEFONAKTIEBOLAGET LM ERICSSON (PUBL), Stockholm (SE)

(72) Inventors: Andreas Nilsson, Göteborg (SE); Niklas Jaldén, Enköping (SE)

(73) Assignee: Telefonaktiebolaget LM Erisson (Publ), Stockholm (SE)

( * ) Notice: Subject to any disclaimer, the term of this patent is extended or adjusted under 35 U.S.C. 154(b) by 171 days.

(21) Appl. No.: 15/556,414

(22) PCT Filed: Mar. 9, 2015

(86) PCT No.: PCT/EP2015/054840
§ 371 (c)(1),
(2) Date: Sep. 7, 2017

(87) PCT Pub. No.: WO2016/141966
PCT Pub. Date: Sep. 15, 2016

(65) Prior Publication Data
US 2018/0109962 A1    Apr. 19, 2018

(51) Int. Cl.
*H04W 16/28* (2009.01)
*H04W 24/02* (2009.01)
(Continued)

(52) U.S. Cl.
CPC .......... *H04W 16/28* (2013.01); *H04B 7/022* (2013.01); *H04B 7/0617* (2013.01);
(Continued)

(58) Field of Classification Search
None
See application file for complete search history.

(56) References Cited

U.S. PATENT DOCUMENTS

2007/0021069 A1* 1/2007 Abramov ............. H04B 7/0408
                                                                    455/63.4
2013/0260769 A1* 10/2013 Marce .................... H04W 36/32
                                                                    455/440
(Continued)

OTHER PUBLICATIONS

International Search Report and Written Opinion issued in Application No. PCT/EP2015/054840 dated Oct. 21, 2015, 9 pages.
(Continued)

*Primary Examiner* — Steve R Young
(74) *Attorney, Agent, or Firm* — Patent Portfolio Builders, PLLC

(57) ABSTRACT

The present disclosure relates to a first wireless communication node (1) comprising at least one antenna arrangement (2), each antenna arrangement (2) having a beam pattern (3) with a certain first coverage (4). The first wireless communication node (1) is arranged to nm a configuration algorithm to optimize the beam pattern (3). The first wireless communication node (1) is also arranged to determine if at least one neighbouring wireless communication node (5, 6; 5') is arranged to at least partly cover said first coverage (4) such that an at least partial overlap occurs, and to which degree said neighbouring wireless communication node (5, 6; 5') covers said first coverage (4). The first wireless communication node (1) is furthermore arranged to run the algorithm at a certain pace in dependence of said degree. The present disclosure also relates to a corresponding method.

18 Claims, 4 Drawing Sheets

(51) Int. Cl.
  *H04B 7/022*     (2017.01)
  *H04B 7/06*      (2006.01)
  *H04W 24/04*         (2009.01)
  *H04W 84/18*         (2009.01)

(52) U.S. Cl.
  CPC .......... *H04B 7/0682* (2013.01); *H04W 24/02* (2013.01); *H04W 24/04* (2013.01); *H04W 84/18* (2013.01)

(56) References Cited

U.S. PATENT DOCUMENTS

| | | | |
|---|---|---|---|
| 2013/0331114 A1* | 12/2013 | Gormley | H04W 72/082 455/452.1 |
| 2015/0373639 A1* | 12/2015 | Zhou | H04W 52/02 370/311 |
| 2017/0013468 A1* | 1/2017 | Zhu | H04W 16/14 |
| 2019/0210742 A1* | 7/2019 | Satak | H04B 7/18513 |

OTHER PUBLICATIONS

Wu et al.: "An Autonomous Scheme of Hotspot Adaptation for Small Cell with Active Antennas", 2014 IEEE International Conference on Internet of Things (IThings), and IEEE Green Computing and Communications (GreenCom) and IEEE Cyber, Physical and Social Computing (CPSCom), IEEE, Sep. 1, 2014, XP032747589, ISBN: 978-1-4799-5967-9, pp. 280-283.

\* cited by examiner

CONTROLLING AN ANTENNA BEAM OPTIMIZATION ALGORITHM

CROSS REFERENCE TO RELATED APPLICATION(S)

This application is a 35 U.S.C. § 371 National Stage of International Patent Application No. PCT/EP2015/054840, filed Mar. 9, 2015, designating the United States, the disclosure of which is incorporated by reference.

TECHNICAL FIELD

The present disclosure relates to wireless communication systems, and in particular to controlling an antenna beam optimization algorithm.

BACKGROUND

Future generations of cellular networks are expected to provide high data rates, up to several Gbps while at the same time being energy efficient. One possible way to achieve such high data rates and/or to lower the energy consumption in cellular networks is to deploy reconfigurable antennas systems (RAS). RAS is an antenna system whose radiation characteristics can be changed by the network after deployment and adapted to, e.g., current traffic needs. The most common antenna parameter that can be remotely controlled has been the antenna tilt. Technology advances will introduce more possibilities to modify the antenna lobe shapes, far beyond the one-dimensional tilt, which opens up for new possibilities to improve network performance. For example, the antenna system can be reconfigured to better serve a traffic hotspot by, e.g., increasing the antenna gains toward the hotspot location.

To efficiently use RAS, it has to be automatically controlled, for example by using a self-organizing network (SON) algorithm which is called RAS-SON. It is important to distinguish RAS from UE-specific beamforming. RAS is used to shape the cell-specific beam patterns for cell-specific reference signals (CRSs) and control signals, and is typically changed quite slowly, accommodating for changes in the infrastructure or user behaviors, for example on an weekly basis. The UE-specific beamforming is used to shape the beams for UE-specific signals and is typically changed very quickly, for example on a millisecond basis.

Tuning RAS settings for base stations in a wireless network by using SON-algorithms can take several weeks for a large area, for example since there exists many different combinations of possible RAS settings in a network and each RAS setting is typically evaluated during quite long time (hours or days) in order to gather enough statistics. Operators have a resistance against changing antenna parameters in their network after deployment due to the risk of creating coverage holes. One solution to minimize this risk is to change the antenna parameter settings with very small steps, for example the tilt might only be changed and evaluated by one degree at a time. However, when using such small steps, for example antenna beam tilt steps, the time consumption is increased even further.

There is thus a need for controlling a configuration algorithm arranged to optimize the beam pattern, such as RAS-SON, to run more efficiently.

SUMMARY

An object of the present disclosure is to enable control of a configuration algorithm arranged to optimize the beam pattern, such as RAS-SON, to run more efficiently.

This object is achieved by means of a first wireless communication node comprising at least one antenna arrangement, each antenna arrangement having a beam pattern with a certain first coverage. The first wireless communication node is arranged to run a configuration algorithm to optimize the beam pattern. The first wireless communication node is further arranged to determine if at least one neighbouring wireless communication node is arranged to at least partly cover said first coverage such that an at least partial overlap occurs, and to which degree said neighbouring wireless communication node covers said first coverage. The first wireless communication node is furthermore arranged to run the algorithm at a certain pace in dependence of said degree.

This object is also achieved by means of a method for a first wireless communication node using at least one antenna arrangement, each antenna arrangement having a beam pattern with a certain first coverage. The method comprises:

Determining if at least one neighbouring wireless communication node is arranged to at least partly cover said first coverage.

If that is the case, determining to which degree said neighbouring wireless communication node covers said first coverage.

Running an algorithm for optimizing the beam pattern at a certain pace in dependence of said degree.

According to an example, each other wireless communication node comprises at least one corresponding antenna arrangement having a beam pattern with a certain corresponding coverage. The first wireless communication node is furthermore arranged to run the algorithm at a first pace if said degree exceeds a first threshold, otherwise run the algorithm at a second pace, where the first pace exceeds the second pace. Each one of said neighbouring wireless communication node that at least partly cover said first coverage to a degree that exceeds the first threshold is determined to constitute a back-up node.

According to another example, the first wireless communication node is arranged to determine if any one of said neighbouring wireless communication node constitutes an essential back-up node. An essential back-up node is here defined as any other wireless communication node that solely covers a part of said first coverage.

According to another example, if any one of said neighbouring wireless communication node constitutes an essential back-up node, the first wireless communication node is arranged to instruct at least one essential back-up node to retain its antenna parameter settings from when it was determined to constitute a back-up node, when it is determined to constitute an essential back-up node.

According to another example, the first wireless communication node is arranged to receive measurement results from at least one user terminal served by the wireless communication node. The measurement results comprise information regarding received power at said user terminal from said neighbouring wireless communication node. The first wireless communication node is arranged to determine to which degree said neighbouring wireless communication node covers said first coverage based on the received measurement results.

According to another example, the algorithm is in the form of a RAS-SON, reconfigurable antenna system-self-organizing network, algorithm.

Other examples are evident from the dependent claims.

A number of advantages are obtained by means of the present disclosure. Mainly, antenna beam pattern optimizing algorithms, such as RAS-SON algorithms, can be performed in a more aggressive way without increasing risk for coverage holes, which will lead to faster tuning of the RAS Settings.

BRIEF DESCRIPTION OF THE DRAWINGS

The present disclosure will now be described more in detail with reference to the appended drawings, where.

DETAILED DESCRIPTION

Figure 1:
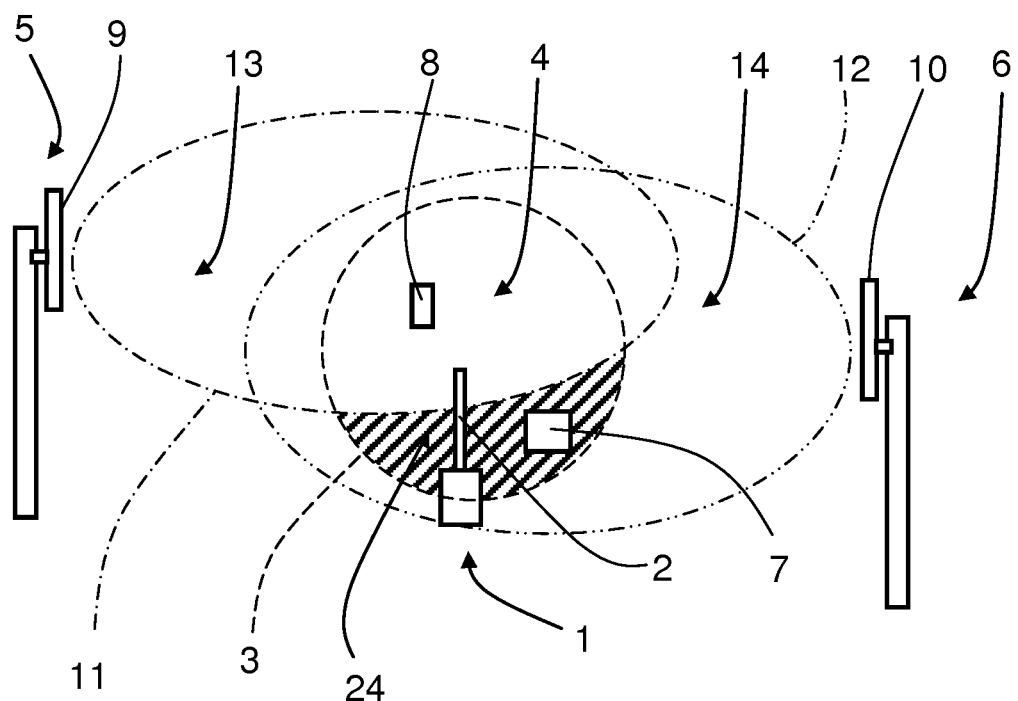
FIG. 1 shows a schematic side view of a first example of a wireless communication node.

With reference to FIG. 1, showing a first example, there is a first wireless communication node 1 comprising a first antenna arrangement 2 that in this example is part of a reconfigurable antenna system (RAS) in a self-organizing network (SON), where the first antenna arrangement 2 has a first beam pattern 3 with a certain first coverage 4. The node 1 is arranged to run a configuration algorithm to optimize the beam pattern 3, which in this example is a RAS-SON algorithm.

In this example, the first wireless communication node 1 is in the form of a micro base station; micro base stations are typically deployed in urban dense areas in order to enhance the capacity of the network. Typically, there exists a macro layer that gives coverage over the whole area and micro cells are then deployed in certain area where the extra capacity is needed. The micro cells are typically deployed at walls of buildings and can be used to serve users both at ground level and high up in buildings. However, this is only an example; the present disclosure is equally applicable to any type of site. Examples of other sites are for example macro sites with multiple frequency band, and/or multi-RAT (radio access technology) deployments.

The wireless first communication node 1 is arranged to communicate with a first user terminal 7 and a second user terminal 8, the user terminals 7, 8 being served by the first wireless communication node 1.

According to the present disclosure, the first wireless communication node 1 is arranged to determine if a neighbouring wireless communication node 5, 6 is arranged to at least partly cover said first coverage 4 such that an at least partial overlap occurs, and to which degree at least one neighbouring wireless communication node 5, 6 covers said first coverage 4. The wireless communication node 1 is arranged to run the RAS-SON algorithm at a certain pace in dependence of said degree.

In this example, there is a second wireless communication node 5 and a third wireless communication node 6, where the second wireless communication node 5 comprises a second antenna arrangement 9 having a second beam pattern 11 with a certain corresponding certain second coverage 13. Correspondingly, the third wireless communication node 6 comprises a third antenna arrangement 10 having a third beam pattern 12 with a certain third coverage 14. The second wireless communication node 5 and the third wireless communication node 6 constitute neighbouring wireless communication nodes 5, 6.

The first wireless communication node 1 is arranged to run the RAS-SON algorithm at a first pace if said degree exceeds a first threshold, otherwise run the algorithm at a second pace, where the first pace exceeds the second pace. The first pace is thus quicker and more aggressive than the second pace. Each one of the second wireless communication node 5 and the third wireless communication node 6 that at least partly cover the first coverage 4 to a degree that exceeds the first threshold is determined to constitute a back-up node. In this example, the second coverage 13 of the second wireless communication node 5 partly covers the first coverage 4 to a degree that exceeds the first threshold, and the third coverage 14 of the third wireless communication node 6 completely covers the first coverage 4.

There is thus a certain part 24, indicated with section lines, of the first coverage 4 that only is covered by the third wireless communication node 6, but no part of the first coverage 4 that only is covered by the second wireless communication node 5. An essential back-up node is thus defined as any other wireless communication node 6 that solely covers a part 24 of the first coverage 4. This means that the second wireless communication node 5 constitutes a back-up node, and that the third wireless communication node 6 constitutes an essential back-up node.

In this example, the first wireless communication node 1 constitutes an LTE (Long-Term Evolution) candidate micro base station, where the term candidate micro base station here refers to a micro base station on which it is desired to tune the antenna parameter settings. It is possible for the candidate micro base station, i.e. the first wireless communication node 1, to request the served user terminals 7, 8 to do RSRP (Received Signal Received Power) measurements from neighbouring wireless communication nodes, here the second wireless communication node 5 and the third wireless communication node 6, and report the measurements back to the first wireless communication node 1.

Generally, this means that he first wireless communication node 1 is arranged to receive measurement results from at least one user terminal 7, 8 served by the first wireless communication node 1. These measurement results comprise information regarding received power at said user terminal 7, 8 from said neighbouring wireless communication node 5, 6. The wireless communication node 1 is arranged to determine to which degree said neighbouring wireless communication node 5, 6 covers said first coverage 4 based on the received measurement results. If this is done enough times, it is possible to find out with sufficient high probability if the neighbouring wireless communication nodes 5, 6 have sufficient back-up coverage for the first coverage 4.

The RSRP measurement reports contain information about which neighbouring wireless communication nodes 5, 6 that corresponds to which RSRP value, and therefore it is possible to find out which neighbouring wireless communication node 5, 6 that has back-up coverage for the candidate micro base station. In this way it is possible to find out if any neighbouring wireless communication node 5, 6 constitutes a back-up node, if it has back-up coverage over the entire first coverage 4, or if several different neighbouring wireless communication nodes 5, 6 are needed to complete the back-up coverage. It is also possible to find out if there exist one or more wireless communication nodes 6 that have back-up coverage for the entire first coverage 4. If there exist parts of the first coverage 4 that only is covered by one back-up base station, such back-up base constitutes an essential back-up node for that certain area.

Figure 2:
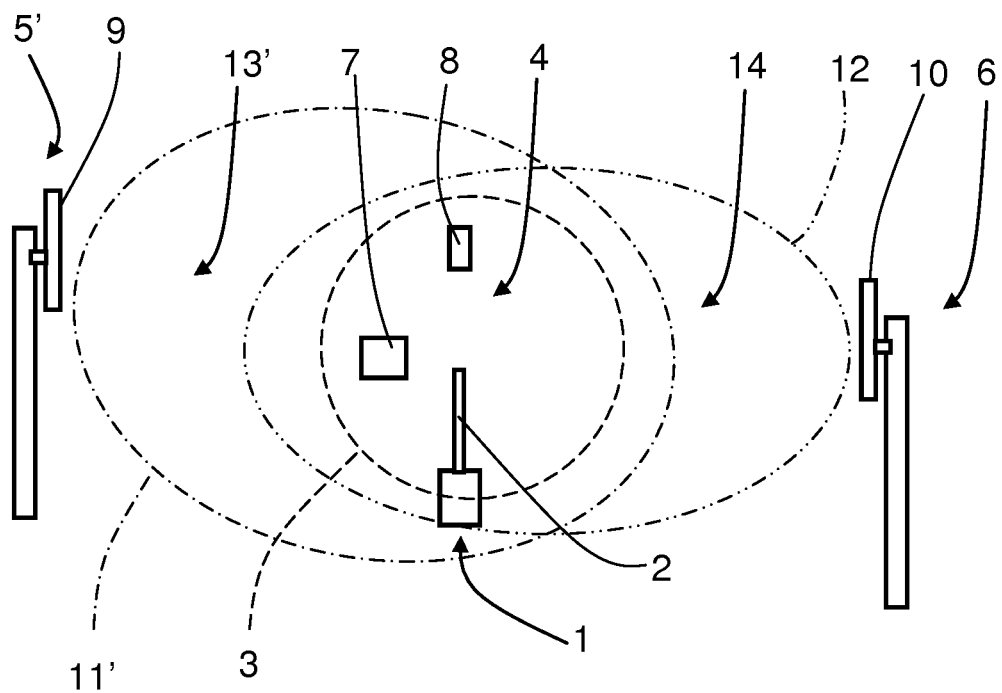
FIG. 2 shows a schematic side view of a second example of a wireless communication node.

With reference to FIG. 2, showing a second example, there is a first wireless communication node 1 having a first antenna arrangement 2 with first beam pattern 3 with a certain first coverage 4 as in the first example. Furthermore, there is a second wireless communication node 5' and a third wireless communication node 6, where the second wireless communication node 5' comprises a second antenna arrangement 9 having a second beam pattern 11' with a certain corresponding certain second coverage 13'. Correspondingly, the third wireless communication node 6 comprises a third antenna arrangement 10 having a third beam pattern 12 with a certain third coverage 14. The second wireless communication node 5' and the third wireless communication node 6 constitute neighbouring wireless communication nodes 5', 6. Here, the second coverage 13' and the third coverage 14 both completely cover the first coverage 4.

The only difference between the first example with reference to FIG. 1 and this second example with reference to FIG. 2 is that the first example, the second coverage 13 only covers a part of the first coverage 4, and in the second example, the second coverage 13' completely covers the first coverage 4. In both the first example and the second example, the third coverage 14 completely covers the first coverage 4. Therefore, in the second example, there are no essential back-up nodes.

With renewed reference to FIG. 1, if a neighbouring wireless communication node 5, 6 is determined to constitute a back-up node, the antenna parameter settings of the first wireless communication node 1 could be tuned with a reduced risk of creating coverage holes, the risk being dependent of the level of the first threshold. The first threshold relates to whether a reasonable large part of the served user terminals in the first coverage 4, connected to the first wireless communication node 1, are covered by at least one neighbouring base station.

The term reasonably large number of served user terminals maps directly to a coverage criterion set up by operators. If it is desired to guarantee that no coverage loss occurs when employing a RAS-SON algorithm at the first pace, then all served user terminals 7, 8 in the first coverage 4 that are connected to the first wireless communication node 1 need to have supplementary coverage. With the term coverage it may for example be meant that the SNR (signal-to-noise ratio) coverage of the CRS (cell-specific reference signal) is large enough. Other coverage problems can occur, for example if the SINR (signal to noise and interference) for CRS signals are too low due to too high interference. However, there exist interference cancelation techniques in LTE for CRS signals that can mitigate coverage problems due to too high interference.

During the coverage-overlap measurement period, as well as the RAS-SON tuning period, all neighbouring wireless communication nodes 5, 6 that are determined to constitute back-up nodes may be controlled to keep their antenna parameter settings, and thus their antenna radiation patterns, fixed in order to guarantee that the measured RSRP samples collected are representative of the current network state. Such synchronization between nodes may be made with for example so-called X2 signaling between nodes, or managed by a centralized node or SON OM (Optimization Manager), etc. This may be seen as a protective mode that neighbouring wireless communication node 5, 6 that are determined to constitute back-up nodes, and/or essential back-up nodes, enter where they disable any RAS-SON functionality (if existing) for the period during which a RAS-SON algorithm is run for the first wireless communication node 1.

Alternatively, the above may be applicable only in the case when a wireless communication node 6 is determined to constitute an essential back-up node. Then the antenna parameter settings of only the essential back-up base stations are kept fixed during the antenna parameter optimization of the first wireless communication node 1.

When a RAS-SON algorithm is run, an antenna parameter sweep of the first wireless communication node 1 is made. If a neighbouring wireless communication node 5, 6 then temporarily gets an increased traffic load due to traffic offloading from the first wireless communication node 1, this could lead to traffic overload in one or several of the neighbouring wireless communication nodes 5, 6. In order to avoid such a scenario, it is for example possible to keep track of the load in neighbouring wireless communication node 5, 6 during the antenna parameter sweep of the first wireless communication node 1. If it then is detected that a traffic overload occurs at any one of the neighbouring wireless communication nodes 5, 6, the first wireless communication node 1 is for example arranged to switch back to the initial antenna parameter settings that were used before running the RAS-SON algorithm, alternatively try another antenna parameter setting.

How much measurement statistics that is needed before a decision can be made can for example be based on how the deployment looks like in the area in question. For example, if the first wireless communication node 1 is constituted by a new micro base station that is deployed in a network for the purpose of adding extra capacity, and it is more or less know from before that there exist no or few coverage holes in the area, then the probability is small that the first wireless communication node 1 does not have back-up coverage and hence less measurements statistics are needed. On the other hand, if the first wireless communication node 1 is deployed in an area where the coverage is not known from before, more measurements are need before a decision can be made.

Furthermore, if all RSRP measurements show multiple back-up nodes, the risk for areas without back-up coverage is less and therefore less statistics are need. On the other hand if several user terminals report that only one back-up node exists, the risk for areas without back-up coverage is large, and hence more statistics needs to be gathered before a decision can be made.

Usually new RAS settings are needed in a network when one or several new nodes are deployed in the area. In such case, the existing nodes, such as base stations, already had plenty of time to collect statistic and hence many of these nodes would already have obtained information regarding if they have back-up coverage or not. During the RSRP measurements it is important that other base stations do not change its radiation pattern or that the system keeps track of which base stations that have changed its radiation pattern.

Regarding algorithms and their behavior, if a RAS-SON algorithm sweeps the tilt of an antenna radiation beam pattern with one degrees tilt step, it would take many tilt steps in order to find the optimal tilt settings. However, if a more aggressive tilt sweep could be used, the optimal tilt settings could be found much quicker. One way to speed up the tilt sweep algorithm is to first use a larger tilt step in order to find the smooth large variations. Once the optimal tilt has been found for the large variations, a finer tilt sweep could be used to find the exact optima. However, using relatively large tilt steps is preferably only made if the neighbouring wireless communication nodes 5, 6 provide sufficient back-up coverage for the first coverage 4 as described previously, enabling the RAS-SON algorithm to be run in a more aggressive fashion.

When using large tilt steps, such as for example about 10°, it is preferred to slowly change the antenna parameters from one tilt step to the next in order to give the served user terminals 7, 8 in the first coverage 4 that are connected to the first wireless communication node 1 enough time to adapt to the new settings. Such adaptations comprise handover to other cells or handover to a back-up node before changing tilt step by using the knowledge about second strongest neighbouring cell for each served user terminals 7, 8.

Figure 3:
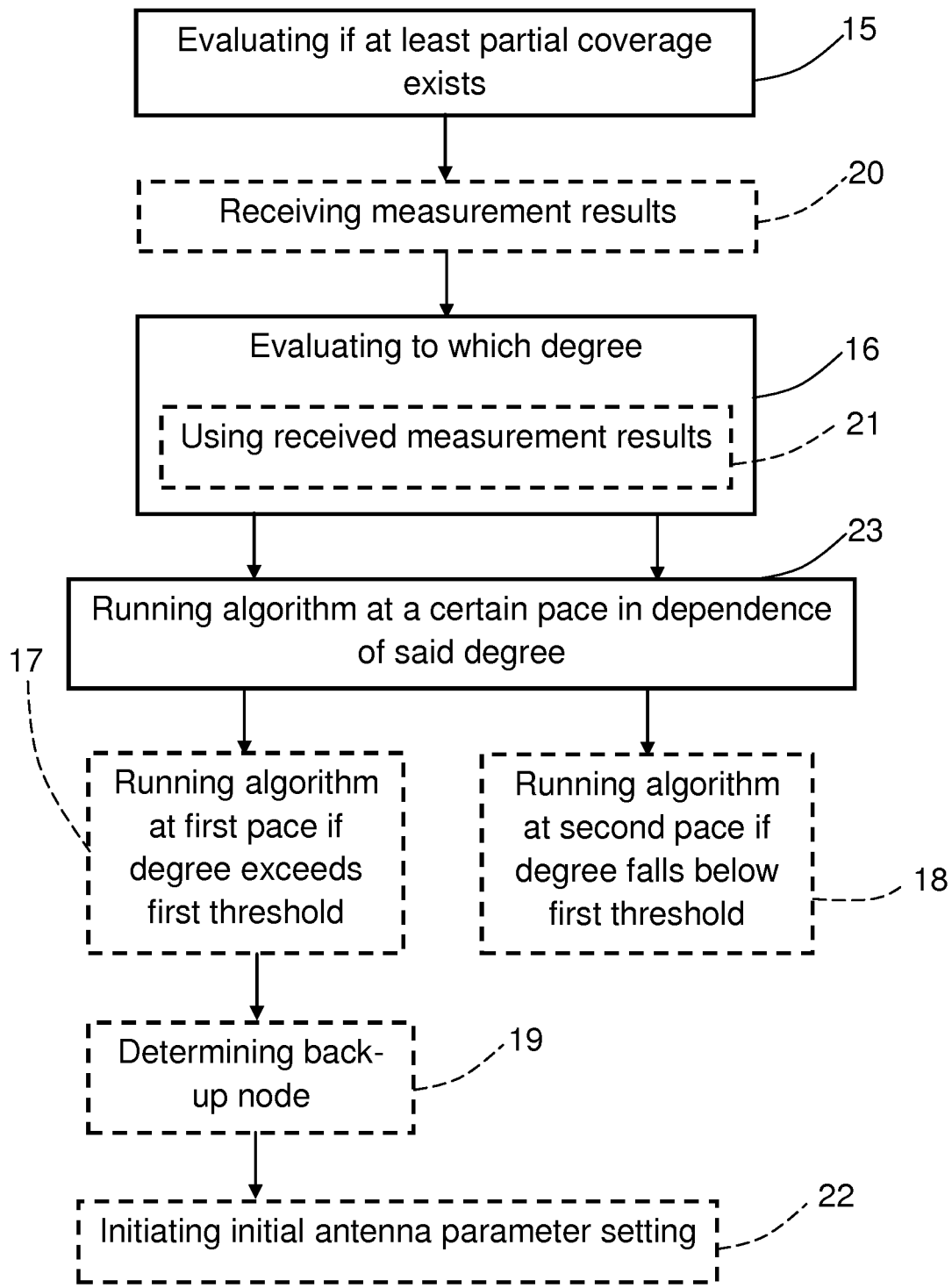
FIG. 3 shows a flowchart illustrating methods according to the present disclosure.

With reference to FIG. 3, the present disclosure also applies to a method for a first wireless communication node 1 using at least one antenna arrangement 2, each antenna arrangement 2 having a beam pattern 3 with a certain first coverage 4. The method comprises:

15: Determining if at least one neighbouring wireless communication node 5, 6; 5' is arranged to at least partly cover said first coverage 4.

16: If that is the case, determining to which degree said neighbouring wireless communication node 5, 6; 5' covers said first coverage 4.

23: Running an algorithm for optimizing the beam pattern 3 at a certain pace in dependence of said degree.

According to an example, the method comprises:

17: Running the algorithm at a first pace if said degree exceeds a first threshold; otherwise

18: running the algorithm at a second pace, where the first pace exceeds the second pace, and

19: determining each one of said neighbouring wireless communication node 5, 6; 5' that at least partly cover said first coverage 4 to a degree that exceeds the first threshold, if any, to constitute a back-up node.

According to another example, the method comprises:

20: Receiving measurement results from at least one user terminal 7, 8 served by the wireless communication node 1, the measurement results comprising information regarding received power at said user terminal 7, 8 from said neighbouring wireless communication node 5, 6; 5'.

21: Determining to which degree said neighbouring wireless communication node 5, 6; 5' covers said first coverage 4 based on the received measurement results.

According to another example, the method comprises:

22: initiating an initial antenna parameter setting for said antenna arrangement 2 when running the algorithm, either if said neighbouring wireless communication node 5, 6; 5' is determined to cover said first coverage 4 to a degree that falls below a second threshold, or if said neighbouring wireless communication node 5, 6; 5' is determined to provide a capacity that falls below a third threshold.

The present disclosure is not limited to the above example, but may vary freely within the scoop of the appended claims. For example, the examples above have been described for a RAS in a SON, but of course the present disclosure may be applied for any type of electrically controllable antenna arrangement where suitable algorithms for optimizing antenna radiation properties, for example for the purpose of cell-shaping, may be used.

Any wireless communication node 1, 5, 6, 5' may comprise one or more antenna arrangements 2, 9, 10, 9', each antenna arrangement 2, 9, 10, 9' having a corresponding beam pattern 3, 11, 12, 11' with a certain corresponding coverage 4, 13, 14, 13'. Each antenna arrangement 2, 9, 10, 9' may be constituted by one or more antenna devices, an antenna device for example being an array antenna which in turn comprises a plurality of antenna elements.

Generally, the present disclosure relates to a first wireless communication node 1 comprising at least one antenna arrangement 2, each antenna arrangement 2 having a beam pattern 3 with a certain first coverage 4, where the first wireless communication node 1 is arranged to run a configuration algorithm to optimize the beam pattern 3, wherein the first wireless communication node 1 is arranged to determine if at least one neighbouring wireless communication node 5, 6; 5' is arranged to at least partly cover said first coverage 4 such that an at least partial overlap occurs, and to which degree said neighbouring wireless communication node 5, 6; 5' covers said first coverage 4, where furthermore the first wireless communication node 1 is arranged to run the algorithm at a certain pace in dependence of said degree.

According to an example, each other wireless communication node 5, 6; 5' comprises at least one corresponding antenna arrangement 9, 10; 9' having a beam pattern 11, 12; 11' with a certain corresponding coverage 13, 14; 13', where furthermore the first wireless communication node 1 is arranged to run the algorithm at a first pace if said degree exceeds a first threshold, otherwise run the algorithm at a second pace, where the first pace exceeds the second pace, where each one of said neighbouring wireless communication node 5, 6; 5' that at least partly cover said first coverage 4 to a degree that exceeds the first threshold is determined to constitute a back-up node.

According to an example, the first wireless communication node 1 is arranged to determine if any one of said neighbouring wireless communication nodes 5, 6; 5' has changed its antenna parameter settings since it was determined to constitute a back-up node.

According to an example, the first wireless communication node 1 is arranged to determine if any one of said neighbouring wireless communication node 5, 6; 5' constitutes an essential back-up node 6, an essential back-up node being defined as any other wireless communication node 6 that solely covers a part 24 of said first coverage 4.

According to an example, if any one of said neighbouring wireless communication node 5, 6; 5' constitutes an essential back-up node, the first wireless communication node 1 is arranged to instruct at least one essential back-up node 6 to retain its antenna parameter settings from when it was determined to constitute a back-up node, when it is determined to constitute an essential back-up node 6.

According to an example, the first wireless communication node 1 is arranged to receive measurement results from at least one user terminal 7, 8 served by the wireless communication node 1, the measurement results comprising information regarding received power at said user terminal 7, 8 from said neighbouring wireless communication node 5, 6; 5', where the first wireless communication node 1 is arranged to determine to which degree said neighbouring wireless communication node 5, 6; 5' covers said first coverage 4 based on the received measurement results.

According to an example, the first wireless communication node 1 is arranged to initiate an initial antenna parameter setting when running the algorithm, either if said neighbouring wireless communication node 5, 6; 5' is determined to cover said first coverage 4 to a degree that falls below a second threshold, or if said neighbouring wireless communication node 5, 6; 5' is determined to provide a capacity that falls below a third threshold.

According to an example, the algorithm is in the form of a RAS-SON, reconfigurable antenna system-self-organizing network, algorithm.

Generally, the present disclosure also relates to a method for a first wireless communication node 1 using at least one antenna arrangement 2, each antenna arrangement 2 having a beam pattern 3 with a certain first coverage 4, wherein the method comprises:

15: determining if at least one neighbouring wireless communication node 5, 6; 5' is arranged to at least partly cover said first coverage 4;

16: if that is the case, determining to which degree said neighbouring wireless communication node 5, 6; 5' covers said first coverage 4; and 23: running an algorithm for optimizing the beam pattern 3 at a certain pace in dependence of said degree.

According to an example, the method comprises:

17: running the algorithm at a first pace if said degree exceeds a first threshold; otherwise 18: running the algorithm at a second pace, where the first pace exceeds the second pace; and 19: determining each one of said neighbouring wireless communication node 5, 6; 5' that at least partly cover said first coverage 4 to a degree that exceeds the first threshold, if any, to constitute a back-up node.

According to an example, the method comprises:

20: receiving measurement results from at least one user terminal 7, 8 served by the wireless communication node 1, the measurement results comprising information regarding received power at said user terminal 7, 8 from said neighbouring wireless communication node 5, 6; 5'; and 21: determining to which degree said neighbouring wireless communication node 5, 6; 5' covers said first coverage 4 based on the received measurement results.

According to an example, the method comprises:

22: initiating an initial antenna parameter setting for said antenna arrangement 2 when running the algorithm, either if said neighbouring wireless communication node 5, 6; 5' is determined to cover said first coverage 4 to a degree that falls below a second threshold, or if said neighbouring wireless communication node 5, 6; 5' is determined to provide a capacity that falls below a third threshold.

According to an example, the algorithm is in the form of a RAS-SON, reconfigurable antenna system-self-organizing network, algorithm.

According to an example, the RAS-SON algorithm is used to change at least one antenna parameter from one value to another in a continuous sweep.

Figure 4:
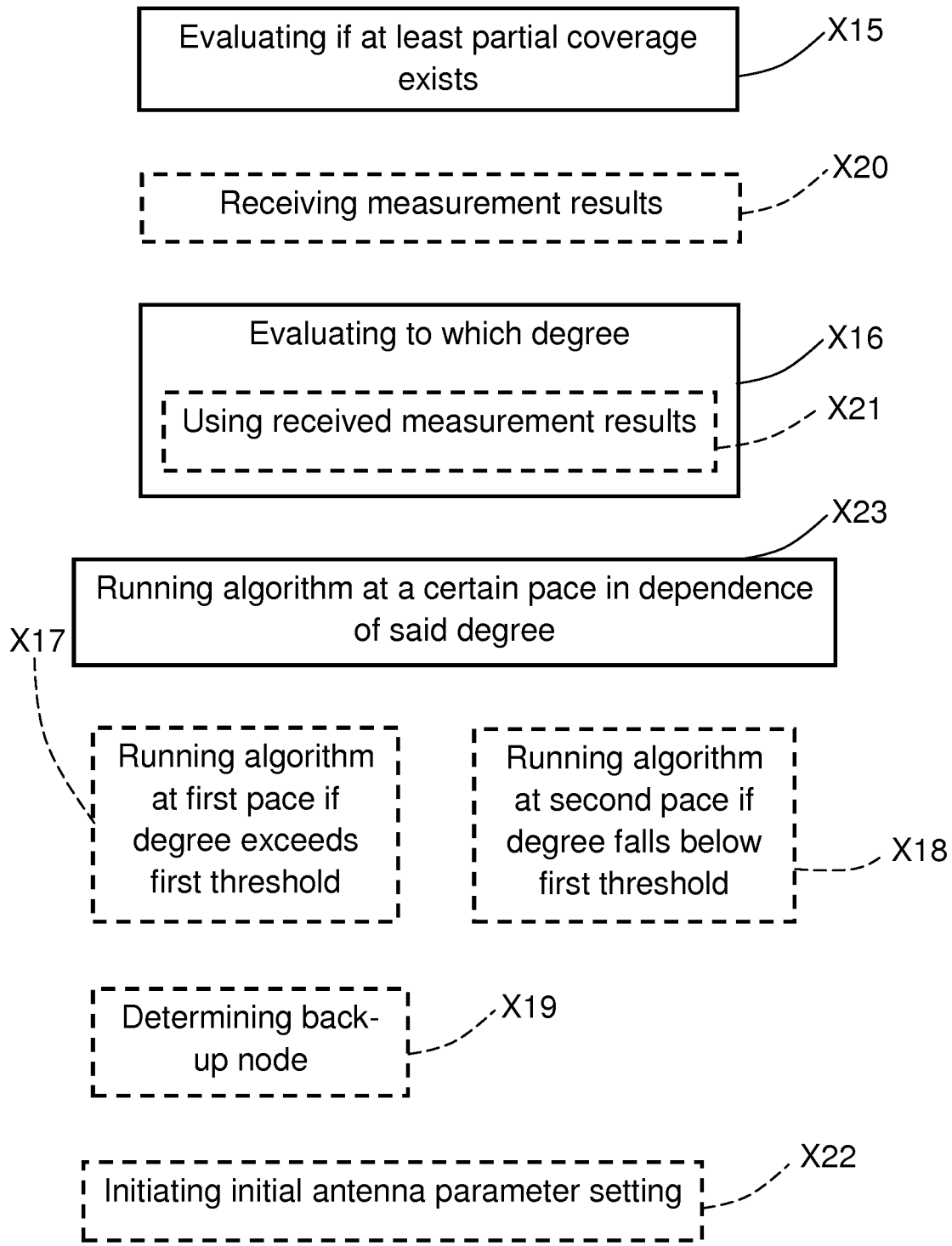
FIG. 4 illustrates a wireless communication node according to some aspects of the present disclosure.

FIG. 4 shows a wireless communication node 1 with at least one antenna arrangement 2, each antenna arrangement 2 having a beam pattern 3 with a certain first coverage 4. The wireless communication node 1 comprises:

A first determining module X15 configured to determine if at least one neighbouring wireless communication node 5, 6; 5' is arranged to at least partly cover said first coverage 4;

A second determining module X16 configured to determine to which degree said neighbouring wireless communication node 5, 6; 5' covers said first coverage 4, if the first determining module X15 determines that at least one neighbouring wireless communication node 5, 6; 5' is arranged to at least partly cover said first coverage 4

A first algorithm running module X23 configured to run an algorithm for optimizing the beam pattern 3 at a certain pace in dependence of said degree.

According to some aspects, the communication node 1 further comprises:

A second algorithm running module X17 configured to run the algorithm at a first pace if said degree exceeds a first threshold; otherwise A third algorithm running module X18 configured to run the algorithm at a second pace, where the first pace exceeds the second pace; and A third determining module X19 configured to determine each one of said neighbouring wireless communication node 5, 6; 5' that at least partly cover said first coverage 4 to a degree that exceeds the first threshold, if any, to constitute a back-up node.

According to some aspects, the communication node 1 further comprises:

A receiving module X20 configured to receive measurement results from at least one user terminal 7, 8 served by the wireless communication node 1, the measurement results comprising information regarding received power at said user terminal 7, 8 from said neighbouring wireless communication node 5, 6; 5'; and A fourth determining module X21 configured to determine to which degree said neighbouring wireless communication node 5, 6; 5' covers said first coverage 4 based on the received measurement results.

According to some aspects, the communication node 1 further comprises:

An initiating module X22 configured to initiate an initial antenna parameter setting for said antenna arrangement 2 when running the algorithm, either if said neighbouring wireless communication node 5, 6; 5' is determined to cover said first coverage 4 to a degree that falls below a second threshold, or if said neighbouring wireless communication node 5, 6; 5' is determined to provide a capacity that falls below a third threshold.

The invention claimed is:

1. A first wireless communication node comprising an antenna arrangement, the antenna arrangement having a beam pattern with a first coverage area, wherein the first wireless communication node is configured to:

determine a degree of overlap between the first coverage area of the beam pattern of the first wireless communication node and a second coverage area of a beam pattern of a neighbouring wireless communication node; and optimize the beam pattern of the antenna arrangement using an algorithm, wherein optimizing the beam pattern of the antenna arrangement using the algorithm comprises controlling a speed of running the algorithm based on the determined degree of the overlap between the first coverage area of the beam pattern of the first wireless communication node and the second coverage area of the beam pattern of the neighbouring wireless communication node.

2. The first wireless communication node of claim 1, wherein:

the first wireless communication node is arranged to run the algorithm at a first speed if said degree exceeds a first threshold and to run the algorithm at a second speed if said degree does not exceed the first threshold, the first speed exceeds the second speed, and a wireless communication node that at least partly covers said first coverage area to a degree that exceeds the first threshold is determined to constitute a back-up node.

3. The first wireless communication node of claim 2, wherein:

the neighbouring wireless communication node has been determined to constitute the back-up node, and the first wireless communication node is arranged to determine if said neighbouring wireless communication node has changed antenna parameter settings since the neighbouring wireless communication node was determined to constitute the back-up node.

4. The first wireless communication node of claim 2, wherein the first wireless communication node is arranged to determine if said neighbouring wireless communication node constitutes an essential back-up node, the essential back-up node being defined as any other wireless communication node that solely covers a part of said first coverage area.

5. The first wireless communication node of claim 4, wherein if said neighbouring wireless communication node constitutes the essential back-up node, the first wireless communication node is arranged to instruct the neighbouring wireless communication node to retain antenna parameter settings that the neighbouring wireless communication node used when the neighbouring wireless communication node was determined to constitute the back-up node.

6. The first wireless communication node of claim 1, wherein the first wireless communication node is arranged to receive measurement results from at least one user terminal served by the first wireless communication node, the measurement results comprising information regarding received power at said at least one user terminal from said neighbouring wireless communication node, and wherein the first wireless communication node is arranged to determine to which degree said neighbouring wireless communication node covers said first coverage area based on the received measurement results.

7. The first wireless communication node of claim 1, wherein the first wireless communication node is arranged to initiate an initial antenna parameter setting when running the algorithm if said neighbouring wireless communication node is determined to cover said first coverage area to a degree that falls below a first threshold, or if said neighbouring wireless communication node is determined to provide a capacity that falls below a second threshold.

8. The first wireless communication node of claim 1, wherein the algorithm is in the form of a reconfigurable antenna system-self-organizing network (RAS-SON) algorithm.

9. A method for a first wireless communication node using an antenna arrangement, the antenna arrangement having a beam pattern with a first coverage area, wherein the method comprises:
determining a degree of overlap between the first coverage area of the beam pattern of the first wireless communication node and a second coverage area of a beam pattern of a neighbouring wireless communication node; and
optimizing the beam pattern of the antenna arrangement using an algorithm, wherein optimizing the beam pattern of the antenna arrangement using the algorithm comprises controlling a speed of running the algorithm based on the determined degree of the overlap between the first coverage area of the beam pattern of the first wireless communication node and the second coverage area of the beam pattern of the neighbouring wireless communication node.

10. The method of claim 9, wherein the method further comprises:
running the algorithm at a first speed if said degree exceeds a first threshold;
running the algorithm at a second speed if said degree does not exceed the first threshold, wherein the first speed exceeds the second speed; and
determining a wireless communication node that at least partly covers said first coverage area to a degree that exceeds the first threshold to constitute a back-up node.

11. The method of claim 9, wherein the method further comprises:
receiving measurement results from at least one user terminal served by the first wireless communication node, the measurement results comprising information regarding received power at said at least one user terminal from said neighbouring wireless communication node; and
determining to which degree said neighbouring wireless communication node covers said first coverage area based on the received measurement results.

12. The method of claim 9, wherein the method further comprises:
initiating an initial antenna parameter setting for said antenna arrangement when running the algorithm if said neighbouring wireless communication node is determined to cover said first coverage area to a degree that falls below a first threshold, or if said neighbouring wireless communication node is determined to provide a capacity that falls below a second threshold.

13. The method of claim 9, wherein the algorithm is in the form of a reconfigurable antenna system-self-organizing network (RAS-SON) algorithm.

14. The method of claim 13, wherein the RAS-SON algorithm is used to change at least one antenna parameter from one value to another in a continuous sweep.

15. The first wireless communication node of claim 1, wherein the first wireless communication node is a base station.

16. The method of claim 9, wherein the first wireless communication node is a base station.

17. The first wireless communication node of claim 1, wherein controlling the speed of running the algorithm based on the determined degree of the overlap comprises:
comparing the determined degree of the overlap with a threshold, and
controlling the speed of running the algorithm based on the result of the comparison.

18. The method of claim 9, wherein controlling the speed of running the algorithm based on the determined degree of the overlap comprises:
comparing the determined degree of the overlap with a threshold, and
controlling the speed of running the algorithm based on the result of the comparison.

* * * * *